United States Patent [19]

Rybinski et al.

[11] Patent Number: 5,244,687
[45] Date of Patent: Sep. 14, 1993

[54] PRODUCT AND PROCESS OF PRODUCING A NO-FAT CHEESE ANALOG CONTAINING RENNET CASEIN

[75] Inventors: Barbara E. Rybinski, Memphis; Lila E. Dawson, Germantown; Douglas G. Bixby, Bartlett; Larry E. Woodford, Collierville, all of Tenn.

[73] Assignee: Kraft General Foods, Inc., Northfield, Ill.

[21] Appl. No.: 874,923

[22] Filed: Apr. 28, 1992

[51] Int. Cl.$^5$ .............................................. A23C 19/08
[52] U.S. Cl. ................................... 426/582; 426/506; 426/520; 426/580
[58] Field of Search ................ 426/582, 580, 520, 506

[56] References Cited

U.S. PATENT DOCUMENTS

| | | | |
|---|---|---|---|
| 3,741,774 | 6/1973 | Burwall | 426/582 |
| 4,444,800 | 4/1984 | Bixby et al. | 426/582 |
| 5,061,503 | 10/1991 | Kong-Chan et al. | 426/582 |

Primary Examiner—Helen F. Pratt
Attorney, Agent, or Firm—Thomas A. Marcoux; Linn I. Grim; Thomas R. Savoie

[57] ABSTRACT

A no-fat cheese analog having the texture, body and eating qualities of cheese is produced by admixing about 15% to about 35% of a coagulated skim milk product having a fat content of less than 2%, about 15% to about 35% dry particulate rennet casein, about 1% to about 3% of an edible emulsifying salt, sufficient quantities of flavoring agents and acidulants to impart desired flavor and pH, and about 30% to about 65% water; said dry rennet casein being hydrated in said water by action of said emulsifying salt at temperatures of about 160° F. to about 200° F. under agitation conditions for a time period sufficient to provide a plastic homogenous body being substantially free of unhydrated rennet casein particles, said edible emulsifying salt being present at about 2% to about 15% by weight of the said particulate rennet casein, said emulsifying salt being selected from the group consisting of alkali metal phosphates, citrate salts and mixtures thereof.

24 Claims, No Drawings

PRODUCT AND PROCESS OF PRODUCING A NO-FAT CHEESE ANALOG CONTAINING RENNET CASEIN

FIELD OF THE INVENTION

The present invention relates to no-fat cheese analogs produced by using a combination of rennet casein and a coagulated skim milk product (containing less than 2% fat). "No-fat cheese analog" as used herein and in the appended claims means a cheese analog having a total fat content of less than 0.5%.

BACKGROUND OF THE INVENTION

Casein is a by-product of the dairy industry and is usually prepared from skim milk by acid precipitation (acid casein) or by enzyme coagulation with rennin (rennet casein). Rennet casein is preferred to acid casein for many food uses due to its better flavor and flavor retention characteristics and has been used to make cheese analogs. Baker's cheese (a low-fat coagulated skim milk curd, similar to cottage cheese) has also been used in making cheese analogs. However, these products have not been used together to make a no-fat cheese analog.

Prior art patents, such as Middleton U.S. Pat. Nos. 4,822,623, Galal et al. 4,397,926 and Bixby et al., 4,444,800, have shown how to make cheese analogs from dry rennet casein but these analogs all contain about 20% fat or edible oil and cannot be considered no-fat cheese analogs.

Several patents do disclose a no-fat cheese analog. Crane U.S. Pat. No. 5,079,024 uses cottage cheese to make a no-fat cream cheese. Zeller U.S. Pat. No. 4,631,196 uses about 50% baker's cheese and 3% caseinate (Example 1) to make a no-fat dairy product with a cheese flavor. Swanson et al. U.S. Pat. No. 4,343,817 has the option of controlling the type and amount of fat addition in making a cheese analog from casein and liquid whey.

Many patents disclose how to make low-fat cheese analogs containing up to 3% fat. Representative of these are U.S. Pat. No. 4,244,983, to Czulak et al.; U.S. Pat. No. 4,476,143, Kneubuehl et al. U.S. Pat. No. 4,366,174, Wirchansky, U.S. Pat. No. 4,749,584 and U.S. Pat. No. 5,080,913 to Gamay. These patents all use a coagulated skim milk. and Wirchansky disclose using baker's cheese for making the analog.

Various patents, such as Swanson et al. U.S. Pat. No. 4,459,313 and Melachouris et al. U.S. Pat. No. 4,163,069 make a cheese analog which has no fat but is then combined with a natural cheese containing fat.

Accordingly, it is a principle object of the present invention to provide a no-fat cheese analog having the texture, body and eating qualities of cheese.

It is another object to provide a method for making a cheese analog which has substantially no fat and which is adapted to large scale commercial production.

Still another object is to provide a no-fat cheese analog which need not be combined with natural cheese to be consumed.

These and other objects of the invention will become more apparent from the following summary and detailed description.

SUMMARY OF THE INVENTION

The present invention is a novel no-fat (less than 0.5%) cheese analog product and process for making the analog. The product is formed using a combination of a coagulated skim milk product (such as baker's cheese) having substantially no fat (less than 2%) and rennet casein together with water, emulsifying salts and other conventional ingredients used in cheese analog production.

It is unexpected that all of the fat in the cheese analog of the invention can be removed while still retaining the texture, body and eating qualities of cheese. The invention comprises admixing about 15% to about 35% of a coagulated skim milk product, such as baker's cheese, having a fat content of less than 2%, about 15% to about 35% dry particulate rennet casein, about 1% to about 3% of an edible emulsifying salt and sufficient quantities of flavoring agents and acidulants to impart desired flavor and pH to the cheese analog in about 30% to about 70% water; said dry rennet casein being hydrated in said water by action of said emulsifying salt at a temperature of about 160° F. to about 200° F. under agitation conditions for a time sufficient to provide a plastic homogeneous body being substantially free of unhydrated rennet casein particles, said edible emulsifying salt being present at about 2% to about 15% by weight of the said particulate rennet casein, said emulsifying agent being selected from the group consisting of alkali metal phosphate salts, citrate salts and mixtures thereof.

The term "emulsifying salts" as used herein is used to refer to materials commonly known as "emulsifying salts" to emulsify the fat conventionally used in cheese formulations. Since there is no fat in the cheese analog formulations of this invention, it is understood that these emulsifying agents are acting as solvating agents or hydrating agents to dissolve or hydrate the dry rennet casein.

While baker's cheese is the preferred coagulated skim milk product to be used in this invention, other coagulated skim milk products similar to baker's cheese may be used as long as the fat content of these curd materials is about 2% or below.

In the process of this invention, the baker's cheese (or other coagulated skim milk product) and dry, particulate rennet casein are hydrated at an elevated temperature with sufficient water to produce a paste-like mass having no discernible unhydrated rennet casein particles present. The hydration is carried out with agitation in the presence of an emulsifying agent and at a temperature of about 160° F. to about 200° F., preferably at about 185° F. to about 195° F. The time period need only be sufficient to hydrate the rennet casein (usually about 1 to about 6 minutes in a steam cooker). The produced cheese analog product can then be cast into loaves, sliced, or shaped into other packaging configurations as desired.

Throughout this specification, examples and claims, all parts and percentages are by weight.

DETAILED DESCRIPTION OF THE PREFERRED EMBODIMENTS

More specifically, the cheese analog embodying this invention is a smooth, homogenous plastic mass wherein the principal protein sources for the cheese analog is a combination of coagulated skim milk (having a fat content of less than 2%) and previously dry but now hydrated edible rennet casein. The coagulated skim milk product is present at about 15% to about 35%, preferably about 15% to about 20%, of the total cheese analog. The rennet casein is present at about 15% to about 35%, preferably at about 20% to about 30%, of the total cheese analog.

The coagulated skim milk product must be a coagulated curd which has a low-fat content of less than 2% and preferably less than 0.5%. Baker's cheese is a commercially available curd made from skim milk using a lactic acid culture (or direct acid addition) to form a smooth, acid curd. It is ideal since it has a fat content of 0.2% or less. Other suitable coagulated skim milk curds are cottage cheese, yogurt, quarg, ymer and pot cheese (all with a fat content of 2% or less).

Rennet casein is a commercially available casein product which contains more of the milk minerals than does acid casein. Typically, rennet casein is isolated from fresh pasteurized skim milk of relatively low fat content by precipitation with a rennet-type enzyme of the type used in cheesemaking. The precipitated rennet casein is then washed, pressed, dried, ground, sieved and blended to provide a substantially uniform, particulate product having a fat content of 0.5% or less.

It is preferred to use a dry, particulate rennet casein having a fat content of 0.5%, a lactose content of about 0.1% to about 0.3% and having a particle size of approximately 30 mesh. Preferably, the ash content of the dry, particulate rennet casein that is used as the starting material is at least about 6%, and more preferably about 7.5%. One commercial source of suitable dry, particulate, edible rennet casein is New Zealand Milk Products, Inc., 6300 River Road, Rosemont, Ill. A typical batch of this particular edible rennet casein has the following analysis:

|  | wt. % |
| --- | --- |
| Moisture | 11.0 |
| Protein (N × 6.38) | 80.6 |
| Milkfat | 0.5 |
| Lactose | 0.1 |
| Mineral Salts | 7.8 |
| TOTAL | 100.0 |
| pH | 7.1 |
| Minerals and trace elements | |
| Calcium | 2.7–3.0 |
| Phosphorous | 1.3–1.4 |
| Magnesium | 0.10–0.12 |
| Sodium | 0.01–0.05 |
| Potassium | 0.01–0.04 |
| Iron | 2–6 mg/kg |

The term "hydrated" as used herein and in the appended claims characterizes previously dry, edible rennet casein that has been hydrated at an elevated temperature and dispersed in an aqueous system as a solution or a gel.

The dry rennet casein has a number of advantages. It is relatively inexpensive, and because of its dry form, can be stored for long periods of time without spoilage or loss of flavor which is a problem with baker'cheese, cottage cheese curd, yogurt, quarg, ymer, pot cheese and other coagulated milk solids products.

Furthermore, by the direct conversion of dry, particulate edible rennet casein together with the baker's cheese (or other coagulated skim milk curd) according to the method of this invention, a simulated no-fat (less than 0.5% fat) cheese-like product which closely resembles a natural cheese in body, texture and flavor characteristics can be obtained. Thus, the present invention has produced a relatively simple, but economical and superior advance in the art of cheese analogs and their formulation.

Edible emulsifying agents such as the phosphate or citrate salts capable of sequestering the calcium present in the dry, particulate rennet casein are employed in amounts of about 5% to about 15% based on the weight of the rennet casein present, depending on the desired body and texture of the cheese-like product. However, if the emulsifying agent content is less than about 2%, incomplete hydration and excessive syneresis will occur. On the other hand, an emulsifying agent content in excess of about 15% produces no additional benefits.

At a relatively high emulsifying agent content, say about 10% to about 15% (based on the weight of rennet casein present), hydration provides a homogenous plastic mass that has a smooth, uniform body like that of process cheese and is free flowing at elevated temperatures. Similarly, at a relatively low emulsifying agent content of about 5% to about 10% (based on the weight of the rennet casein present), a relatively long or semi plastic body, exhibiting some brittleness, is obtained.

Suitable phosphate-containing emulsifying agents include edible salts such as the alkali metal phosphates, e.g., disodium phosphate, trisodium phosphate, sodium hexametaphosphate, sodium tripolyphosphate, tetrasodiumphosphate, disodium diphosphate, monosodium diphosphate, disodium diphosphate, trisodium diphosphate, tetrasodium diphosphate and the like, the sodium aluminum phosphates, and mixtures thereof. A preferred emulsifying agent for the production of the cheese analog is Kasal TM, an autogenous mixture of an alkaline sodium aluminum phosphate having the empirical formula $Na_8Al_2(OH)_2(PO_4)_4$. Other preferred agents are tricalcium phosphate, disodium phosphate, or a mixture thereof. Suitable citrate-containing emulsifying agents include monosodium citrate, disodium citrate, trisodium citrate, and the like.

Water is present in an amount of at least about 100% to about 350%, based on the amount of rennet casein present, and generally constitutes about 30% to about 65% by weight of the composition, depending upon the desired consistency. Water can be added during the premixing and cooking stages of the manufacturing process of this invention. The water that is present serves to hydrate the rennet casein and control consistency of the hydrated mass. If too much water is added, the resulting hydrated mass becomes too fluid and no longer resembles the body of a cheese.

While not essential, it is preferred to add a thickener, such as modified starch. A suitable starch is modified corn starch at a level of between about 2% to about 15%, preferably at about 3% to about 6%.

Modified starches are generally made via enzyme and/or acid modification of the native starch. In the case of corn starch, it is modified to give what is commonly referred to as a "fluidity" starch. These starches are commonly used in the confection industry, and are characterized by low viscosities at cooking (175°–200° F.) temperatures (hence the term fluidity) and relatively high gel strength at and below room temperatures. While modified corn starch is preferred, other conventional modified starches which serve to make the cheese analog less stringy and less tough could also be used. The modified starch enhances much of the same textural qualities provided by the coagulated skim milk product to the hydrated rennet casein mass while at the same time not adding any fat to the cheese analog. Aside from modified starch, a humectant, such as glycerin, can also be added as an optional ingredient at a level of about 0.1 to about 1.0%, preferably at 0.2% to 0.5%. The glycerin serves as a carrier or dispersing agent for minor lipophilic ingredients such as flavors and colors.

Since both dry, particulate rennet casein and the baker's cheese (or other coagulable skim milk product) are bland in flavor, it is desirable to add a small amount of a flavoring agent, acidulant, and salt for flavoring purposes. The normal pH for the product obtained without acidulant is 7; therefore, an acidulant, such as lactic acid or acetic acid, is used to flavor the cheese analog while at the same time lowering the pH of the cheese analog to between about 5.0 to 6.5, preferably about 5.4 to 5.8. About 0.5% to 2.0% of acidulant can be used to give the pH of 5.0 to 6.5 and about 0.8% to 1.4% of the acidulant gives a pH of 5.4 to 5.8. The flavoring agent can be a cheese flavor, diacetyl (2,3-butane-dione) or any other conventional flavor. The acidulant can be any food acid, such as lactic acid, acetic acid, citric acid, sorbic acid, adipic acid, phosphoric acid, propionic acid, butyric acid, $C_1$-$C_8$ carboxylic acids or mixtures thereof. In addition, flavors, colors, and/or spices (besides salt) may be added to the cheese analog.

The method of making a cheese analog directly from rennet casein and a coagulated skim milk product according to the practice of this invention can include premixing within the same processing vessel the dry rennet casein, the coagulated skim milk product, emulsifying agent, and water in an amount which constitutes a major portion of the total water content of the ultimately produced product, with or without acidulants, the starch and flavoring agent. Thereafter, the produced admixture, containing a portion of the remaining water, is agitated and heated to a temperature of at least about 160° F. and up to about 200° F., preferably about 185° F. to about 195° F. at atmospheric pressure, and held at that temperature for a sufficient period of time for the rennet casein to be hydrated. A smooth homogeneous plastic mass is obtained in about 1 to about 6 minutes. Preferably, the heating is accomplished by the injection of live steam, to heat the mass to above 190° F. The steam is turned off when the proper temperature has been reached, but mixing is continued, if necessary, until the mass becomes smooth and plastic. Generally, this takes about 2 to 3 minutes after the steam is turned off. The produced smooth mass containing both hydrated rennet casein and the coagulated skim milk product is then removed from the mixer-cooker and formed into the desired product shape. It is packaged and cooled in either sliced or loaf form according to conventional practice. Premixing of the aforementioned ingredients is not essential. All or a portion of the ingredients can be blended together in the mixer-cooker, if desired.

It is important to agitate the admixture of ingredients during heating. Moreover, severity of agitation during processing can be used to further adjust the body of the ultimately produced cheese analog. For instance, a relatively high shear agitation is desirable for a plastic body such as that for a process cheese analog. On the other hand, for a cheese analog having a relatively short body, e.g., feta cheese, less severe agitation is required.

As indicated, the low-fat cheese analog of this invention need not be combined with a natural cheese prior to being eaten. In certain cases to meet customer preferences, the cheese analog may be blended with a natural cheese in order to meet these preferences. However, in most cases the analog can be eaten "as is" and need not be blended with a natural cheese.

The invention will now be further explained in detail by the following examples which represent actual demonstrations of the invention.

EXAMPLE 1

Preparation of No-Fat Mozzarella Cheese Analog

The following cheese analog formulation was employed:

| INGREDIENTS | % BY WEIGHT |
| --- | --- |
| Water | 46.80 |
| Dry particulate rennet casein | 25.30 |
| s cheese (0.2% Fat) | 18.00 |
| Modified corn starch | 4.40 |
| Kasal (sodium aluminum phosphate) | 1.80 |
| Tricalcium phosphate | 1.40 |
| Lactic acid | 0.60 |
| Disodium phosphate | 0.50 |
| Glycerin | 0.32 |
| Adipic acid | 0.39 |
| Sorbic acid | 0.39 |
| Salt | 0.32 |
| Flavors and Color | 0.78 |
| TOTAL | 100.00 |

The baker's cheese and tricalcium phosphate were admixed with the water and blended together. Dry particulate rennet casein and the remaining dry ingredients were thereafter stirred into the resulting solution. The resulting admixture was then mixed until homogenous, injected with steam under agitation conditions, and cooked until the temperature reached about 190° F. (about 3 minutes).

A smooth fluid mass was obtained which was then filled into the containers and rapidly cooled to room temperature. The edible no-fat mozzarella cheese analog had a pH of about 5.5 and an appearance, taste, texture, and eating quality very similar to a full-fat mozzarella cheese. The fat content of the analog was 0.2%.

EXAMPLE 2

No-Fat Mozzarella Analog (Negative Result)

| INGREDIENTS | % BY WEIGHT |
| --- | --- |
| water | 58.55 |
| dry particulate rennet casein | 28.92 |
| sodium citrate | 1.29 |
| modified corn starch | 5.63 |
| kasal (sodium aluminum phosphate) | 2.31 |
| lactic acid | 1.29 |
| trisodium phosphate (anhyd.) | 0.13 |
| adipic acid | 0.39 |
| sorbic acid | 0.39 |
| salt | 0.32 |
| flavors and color | 0.78 |
| TOTAL | 100.00 |

The procedure of Example 1 was repeated using the above formulation (which lacked baker's cheese). The product produced was unacceptable. It was tough, translucent and had excessive string properties. The Example 1 product (which used baker's cheese) was found to have a much better mouthfeel, the stringy properties were reduced to an acceptable level and the opacity of the product was also acceptable.

EXAMPLE 3

Preparation of No-Fat American Cheese Analog

| INGREDIENTS | % BY WEIGHT |
| --- | --- |
| water | 39.45 |
| rennet casein | 18.98 |
| s cheese | 17.98 |
| modified corn starch | 13.15 |
| kasal (sodium aluminum phosphate) | 1.80 |
| tricalcium phosphate | 1.25 |
| lactic acid (88%) | 1.00 |
| disodium phosphate (anhyd.) | 0.80 |
| maltodextrin | 3.00 |
| adipic acid | 0.40 |
| sorbic acid | 0.30 |
| salt | 0.75 |
| guar gum | 0.50 |
| flavors and color | 0.74 |
| TOTAL | 100.00 |

The procedure of Example 1 was repeated. The no-fat american cheese analog produced had a texture, taste and other characteristics similar to a full-fat american cheese.

EXAMPLE 4

Preparation of No-Fat Havarti Cheese Analog

| INGREDIENTS | % BY WEIGHT |
| --- | --- |
| water | 43.10 |
| dry particulate rennet casein | 22.00 |
| s cheese (0.2% fat) | 18.16 |
| modified corn starch | 4.41 |
| kasal | 1.61 |
| enzyme modified cheese | 4.52 |
| disodium phosphate (anhyd.) | 0.50 |
| maltodextrin | 3.41 |
| adipic acid | 0.31 |
| sorbic acid | 0.31 |
| salt | 0.25 |
| sugar | 1.21 |
| flavors and color | 0.21 |
| TOTAL | 100.00 |

The procedure of Example 1 was repeated using the above formulation. The no-fat Havarti cheese analog produced had a texture, taste, and other characteristics which were similar to a full-fat Havarti cheese.

While this invention has been disclosed by reference to details of preferred embodiments, it is understood that the disclosure is intended in an illustrative rather than a limiting sense. Modifications will readily occur to those skilled in the art which is within the spirit of the invention and the scope of the appended claims.

What is claimed is:

1. A no-fat cheese analog having the texture, body and eating qualities of cheese and a total fat content of less than 0.5% comprising admixing about 15% to about 35% of a coagulated skim milk product having a fat content of less than 2%, about 15% to about 35% dry particulate rennet casein, about 1% to about 3% of an edible emulsifying salt, sufficient quantities of flavoring agents and acidulants to impart desired flavor and pH, and about 30% to about 65% water; said dry rennet casein being hydrated in said water by action of said emulsifying salt at temperatures of about 160° F. to about 200° F. under agitation conditions for a time period sufficient to provide a plastic homogenous body being substantially free of unhydrated rennet casein particles, said edible emulsifying salt being present at about 2% to about 15% by weight of the said particulate rennet casein, said emulsifying salt being selected from the group consisting of alkali metal phosphates, citrate salts and mixtures thereof.

2. The cheese analog of claim 1 wherein the coagulated skim milk product is selected from the group consisting of baker's cheese, cottage cheese, yogurt, quarg, ymer, pot cheese, and combinations thereof.

3. The cheese analog of claim 1 wherein the coagulated skim milk product is baker'cheese.

4. The cheese analog of claim 1 wherein the rennet casein is present at about 20% to about 30% and the coagulated skim milk product is about 15% to about 20%.

5. The cheese analog of claim 1 wherein said rennet casein has a fat content of about 0.5%, a lactose content of about 0.1% and a particle size of about 30 mesh.

6. The cheese analog of claim 1 comprising about 2% to about 15% modified starch.

7. The cheese analog of claim 1 comprising about 2% to about 15% modified corn starch.

8. The cheese analog of claim 1 wherein the acidulant comprises a food acid at a level of about 0.5% to about 2.0% and a pH of about 5.0 to about 6.5.

9. The cheese analog of claim 1 wherein the acidulant comprises a food acid at a level of about 0.8 to about 1.4% and a pH of about 5.4 to about 5.8.

10. The cheese analog of claim 1 wherein the emulsifying salt comprises sodium aluminum phosphate.

11. The cheese analog of claim 1 wherein the hydration of the rennet casein is conducted at about 185° F. to about 195° F. for about 1 minute to about 6 minutes.

12. The cheese analog of claim 1 wherein the hydration temperature is about 190° F. for about 2 minutes to about 3 minutes.

13. The process of preparing a no-fat cheese cheese analog having the texture, body and eating qualities of cheese and a total fat content of less than 0.5% from dry particulate rennet casein and a coagulated skim milk product which comprises admixing in water about 15% to about 35% to a coagulated skim milk product having a fat content under 2%, about 15% to about 35% dry particulate rennet casein, an edible emulsifying salt in an amount of about 2% to about 15% by weight of the rennet casein, being selected from the group consisting of alkali metal phosphate, citrate salts and mixtures thereof, and a sufficient quantity of flavoring agents and acidulants to impart the desired flavor and pH to the final cheese product, heating the resulting admixture to a temperature of about 160° F. to about 200° F., with agitation, and maintaining said admixture at said temperature for a sufficient period of time to hydrate the rennet casein and to provide a plastic homogenous body of cheese analog substantially free of discernible unhydrated rennet casein particles.

14. The process of claim 13 wherein the coagulated skim milk product is selected from the group consisting of baker's cheese, cottage cheese, yogurt, quarg, ymer, pot cheese and combinations thereof.

15. The process of claim 13 wherein the coagulated skim milk product is baker's cheese.

16. The process of claim 13 wherein the admixture contains rennet casein at about 20% to about 30% and the coagulated skim milk product at about 15% to about 20%.

17. The process of claim 13 wherein said rennet casein has a fat content of about 0.5%, a lactose content of about 0.1% and a particle size of about 30 mesh.

18. The process of claim 13 wherein the admixture comprises about 2% to about 15% modified starch.

19. The process of claim 13 wherein the admixture comprises about 2% to about 15% modified corn starch.

20. The process of claim 13 wherein the admixture comprises a food acid acidulant at a level of about 0.5% to about 2.0% and a pH of about 5.0 to about 6.5.

21. The process of claim 13 wherein the admixture comprises a food acid acidulant at a level of about 0.8% to about 1.4% and a pH of about 5.4 to about 5.8.

22. The process of claim 13 wherein the emulsifying salt comprises sodium aluminum phosphate.

23. The process of claim 13 wherein the hydration of rennet casein is conducted at about 185° F. to about 195° F. for about 1 minute to about 6 minutes.

24. The process of claim 23 wherein the hydration temperature is about 190° F. for about 2 minutes to about 3 minutes.

* * * * *